March 31, 1970 TOMOHIKO SADA ET AL 3,504,262
SYSTEM FOR CHARGING THE BATTERY WHICH OPERATES THE
STARTER MOTOR OF AN INTERNAL COMBUSTION ENGINE
Filed Nov. 16, 1966 3 Sheets-Sheet 1

INVENTOR.
TOMOHIKO SADA
NORIYUKI TSUCHIYA
TORU NISHI
BY
ATTORNEY

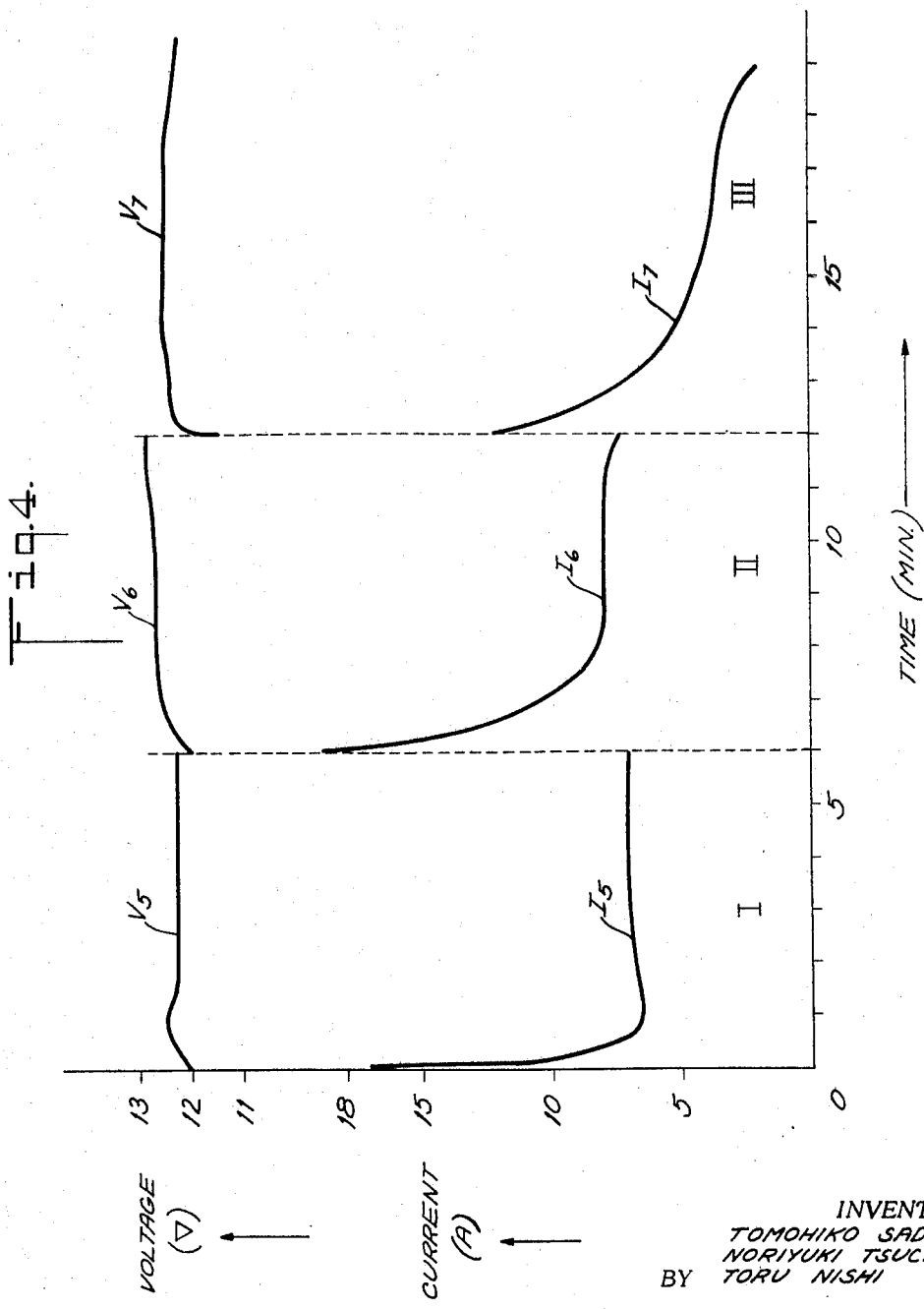

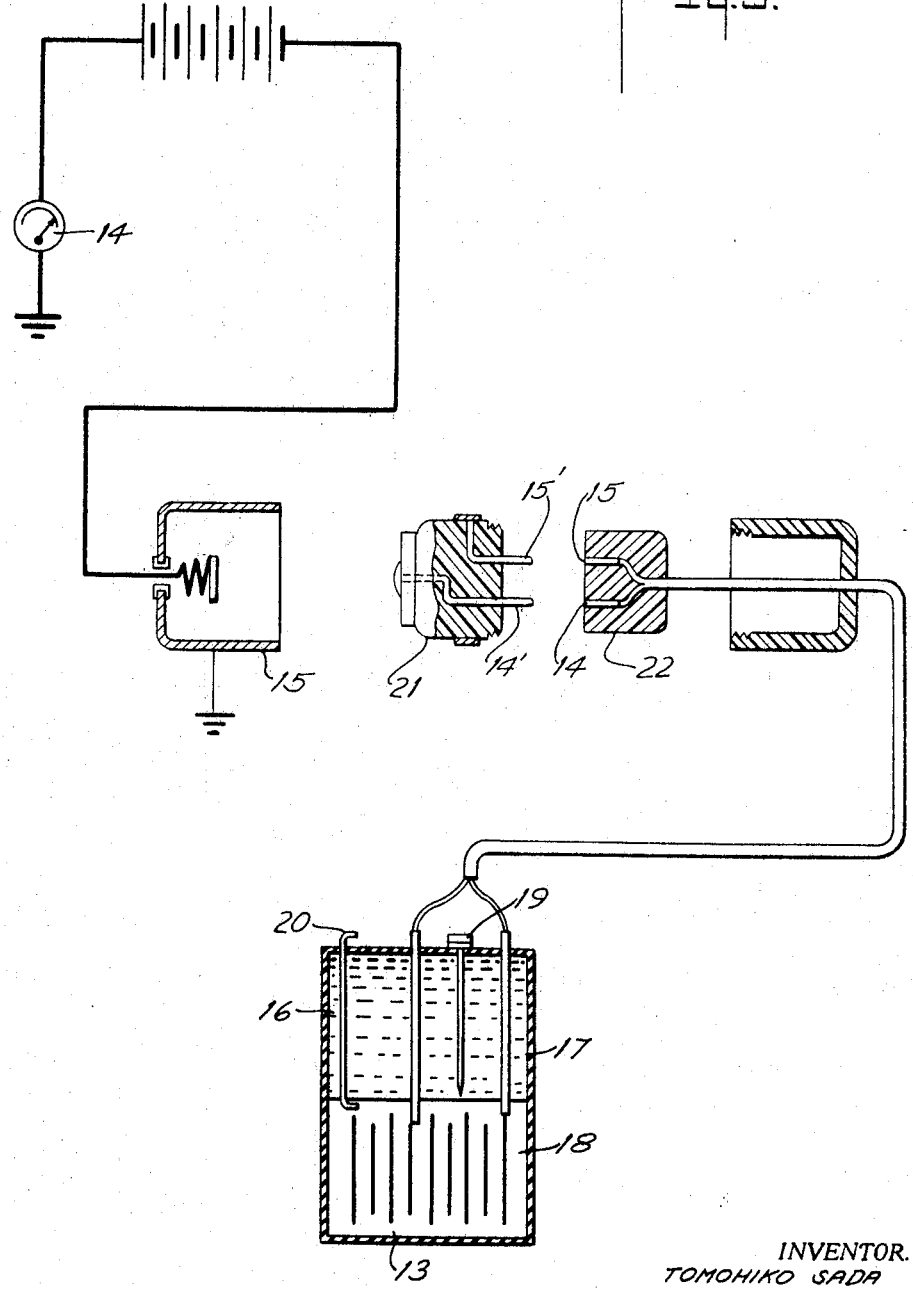

United States Patent Office 3,504,262
Patented Mar. 31, 1970

3,504,262
SYSTEM FOR CHARGING THE BATTERY WHICH OPERATES THE STARTER MOTOR OF AN INTERNAL COMBUSTION ENGINE
Tomohiko Sada, Noriyuki Tsuchiya, and Toru Nishi, Tokyo, Japan, assignors to Sony Corporation, Tokyo, Japan, a corporation of Japan
Filed Nov. 16, 1966, Ser. No. 594,802
Claims priority, application Japan, Nov. 17, 1965, 40/70,690
Int. Cl. H01m 45/04
U.S. Cl. 320—6         4 Claims

ABSTRACT OF THE DISCLOSURE

If the regular automobile battery is discharged to a point where it is unable to energize the starter motor, an inexpensive source is used to charge the battery sufficiently to enable it to energize the starter. The source comprises a deferred action type battery which has a low capacity and a high discharge rate.

---

This invention relates generally to an automobile battery charger and more particularly to a compact, inexpensive, auxiliary battery which may be stored in an automobile and which can be activated upon demand to recharge the regular automobile battery and which may be discarded after such use and replaced by another auxiliary battery.

It is a common occurrence to attempt to start an automobile and find that the battery is either entirely discharged or else so weak that it will not start the automobile. This type of occurrence is particularly prevalent in cold weather. When a battery is too weak to start an automobile one of two things is usually done. One alternative is to have the car towed to a garage where the battery is recharged. This type of recharging usually takes at least several hours. The other alternative is to use the battery from another car to start the automobile engine. This entails having available the necessary cables to interconnect the second automobile's battery with the ignition system of the first automobile and also that the two cars have similar batteries. A third alternative is to carry a spare battery in the automobile. This requires, however, that the auxiliary battery have the same capacity, and the same size and weight as the customary automobile battery. In addition, this auxiliary battery must also be constantly checked in order to be certain that it has not discharged. Due to this fact it is not the common expedient to carry an auxiliary battery in the automobile.

In view of the foregoing it is the primary object of the present invention to provide a compact and inexpensive automobile battery charger that will rapidly charge a regulation automobile battery.

Another object of the present invention is to provide an automobile battery charger which has a larger voltage than the ordinary automobile battery and which is capable of providing a high discharge current for a short period of time in order to recharge a conventional automobile battery.

A further object of the present invention is to provide an automobile battery charger which is inexpensive, lightweight and compact, and which may be instantly energized to provide sufficent energy to recharge a conventional automobile battery and which may then be discarded and replaced by a similar automobile battery charger.

These and further objects, features and advantages of the present invention will appear from a reading of the following detailed description of a preferred embodiment of the invention which is to be read in conjunction with the accompanying drawings wherein like components in the several views are identified by the same reference numeral.

In the drawings:

FIG. 4 is a series of graphs illustrating the charging characteristics of the auxiliary battery of the present invention; and FIG. 5 is a drawing illustrating how the auxiliary battery of the present invention can be interconnected with a conventional battery in an automobile and illustrating one form of how said connection can be achieved.

Briefly stated, the present invention includes an auxiliary battery which can be activated instantaneously. The battery basically consists of two compartments, one compartment containing the electrodes and the other compartment containing the electrolyte. When desired the wall between the two compartments is broken so that the electrolyte can flow around the electrodes to cause the flow of current. The battery must be capable of discharging current at a rate in excess of 750 amperes per second or more at a voltage in excess of the voltage of the automobile battery. This auxiliary battery is preferably stored at some convenient place in the automobile, such for example, as beneath the front seat, and means are provided for instantaneously connecting the auxiliary battery to the main battery to charge the same. In one embodiment of the invention this is done through the cigarette lighter normally provided in an automobile.

Figure 1:
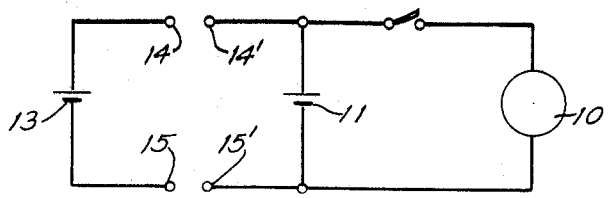
FIG. 1 is a circuit diagram illustrating how conventional automobile batteries are interconnected with the starter motor and how the auxiliary battery of the present invention would be connected in the same circuit.

Referring now to the drawings and particularly to FIG. 1 there is illustrated the conventional method of interconnecting an automobile battery with the starter motor in order to start the automobile engine. In FIG. 1 the numeral 10 represents the automobile starter and the numeral 11 represents the conventional automobile battery. When the ignition switch 12 is turned on, the battery 11 is connected across the starter motor 10 which turns the latter to start the engine. The automobile battery 11 is normally 6 or 12 volts and its capacity is 30 to 100 ampere hours.

In the event that the battery 11 looses its charge or wears down to the point where it will not turn over the starter motor 10 it becomes necessary to recharge the battery 11. This can either be done by towing the automobile to a garage and having the battery recharged, or it is necessary to use an auxiliary battery to either recharge the battery 11 or to use the auxiliary battery to turn over the starter motor 10. This is customarily done by using the battery from another car. This battery must, of course, be of the same capacity and the same electrical characteristics as the battery in the car. If this is done, the battery in the second car is placed in parallel across the battery in the first car. In this way the battery in the second car replaces the battery in the first car and is used to turn over the automobile starter motor 10. If a spare battery is stored in an automobile it is necessary that this battery be also of the same size, shape and characteristics as the battery in the car and this battery must also be checked to be certain that it does not run down or discharge itself.

In accordance with the present invention an auxiliary battery 13 is provided which is compact, lightweight and which is capable of recharging the normal automobile battery 11 in a short period of time. In order to determine what the characteristics of such an auxiliary battery should be, an experiment was performed in which a discharged battery 11 was recharged using conventional prior art charging means. This result is illustrated in Table I and in FIG. 2. The battery 11 selected was a normal 12 volt battery with a capacity of 40 amperes per hour. In Example 1 of Table I the battery was charged for 5 minutes while in Example 2 of Table I the battery 11 was charged for 10 minutes. In Examples 1 and 2 of Table I the first column, labeled $a$, indicates the initial charging current in amperes (A) and these are plotted in FIG. 2. The second column represents amounts of charging in amperes per second (A-sec.) and is labeled $b$; the third column represents operating time for the starter motor 10 in amperes and seconds and is labeled $c$; the fourth column, labeled $d$, represents the amount of discharging in amperes per second, and the last column, which is labeled $e$, represents how much energy is

TABLE I

Example 1

| $a$ (A) | $b$ (A.sec.) | $c$ (A.sec.) | $d$ (A.sec.) | $e$ (percent) |
|---|---|---|---|---|
| $l_1=5$ | 1,500 | 150 x 5<br>150 x 3 | 750<br>450 | 80 |
| $l_2=10$ | 2,400 | 160 x 9<br>150 x 6 | 1,440<br>900 | 96 |
| $l_3=15$ | 3,900 | 160 x 10<br>150 x 7 | 1,600<br>1,050 | 72 |
| $l_4=20$ | 5,100 | 170 x 12<br>150 x 8 | 2,040<br>1,200 | 64 |

Example 2

| $a$ (A) | $b$ (A.sec.) | $c$ (A.sec.) | $d$ (A.sec.) | $e$ (percent) |
|---|---|---|---|---|
| $l_1=5$ | 3,000 | 166 x 8<br>150 x 5 | 1,280<br>750 | 68 |
| $l_2=10$ | 4,800 | 155 x 11<br>150 x 6 | 1,708<br>900 | 54 |
| $l_3=15$ | 7,200 | 170 x 13<br>160 x 8 | 2,200<br>1,280 | 48 |
| $l_4=20$ | 9,000 | 170 x 15<br>160 x 10 | 2,550<br>1,600 | 45 | derived from the charging battery. The fifth column represents the ratio between the fourth column and the second column. In the third column the first item represents that the ignition motor 10 was turned on for 5 seconds while the second line represents that the starter motor 10 was thereafter turned on for 3 seconds. The second row was measured 10 seconds after the automobile motor was stopped for the first time.

In the example given, therefore, where the conventional automobile battery 11 is a normal 12 volt, 40 amp. per hour battery, the auxiliary battery of the present invention, which is identified in general by the numeral 13, should be approximately 20 volts (but must be in excess of 12 volts), and can have a small ampere per hour rating, such for example, as approximately 1 to 5 amperes per hour. The auxiliary battery 13 should also be small, lightweight, compact, cold proof and not have any capacity for self-discharging, i.e., it should be activated virtually instantaneously and can have a short life thereafter since the intention is to use it only once.

Figure 2:
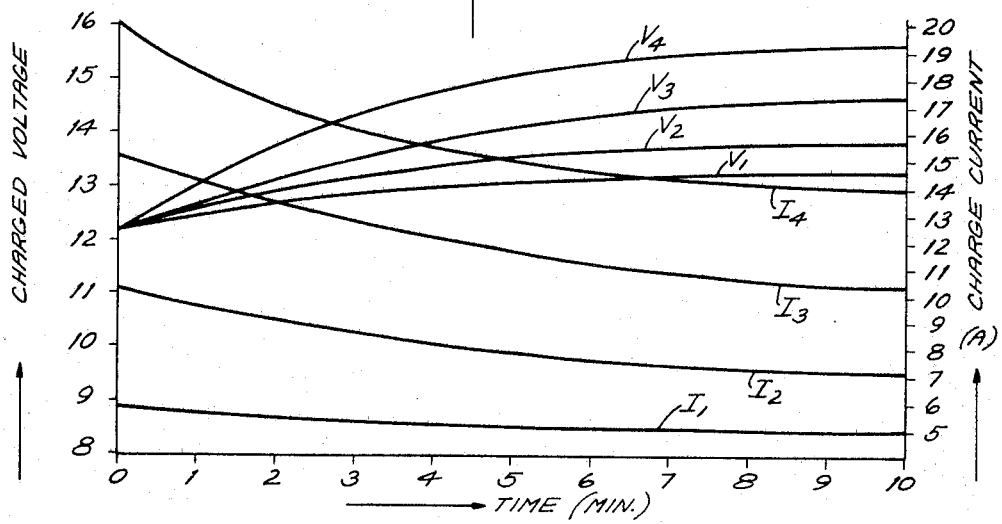
FIG. 2 is a graph illustrating the charging characteristics of conventional prior art automobile batteries.

As can be ascertained from Table I in FIG. 2 the automobile starter motor 10 can be operated with the automobile battery 11 for a period of 8 seconds and draw 166 amps. Additionally, 10 seconds later the starter can be operated for 5 seconds and draw 150 amperes. It has been established that these figures are sufficient to start the automobile engine. In other words, if an automobile battery can produce 150 amperes for approximately 5 to 20 seconds this is sufficient to start the normal automobile engine.

Figure 3:
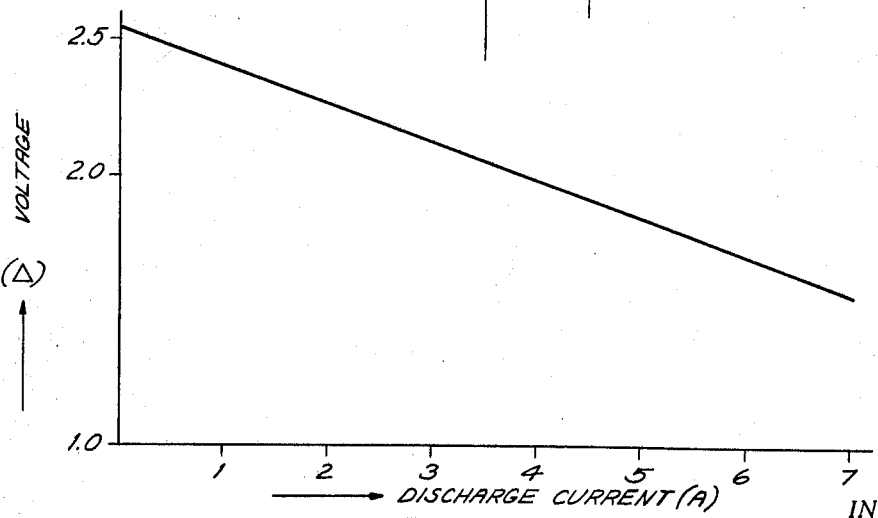
FIG. 3 is a graph illustrating the discharge characteristics of the auxiliary battery of the present invention.

In FIG. 3 there is illustrated the characteristic regulation curve for a typical auxiliary battery 13 constructed in accordance with the present invention. This auxiliary battery 13 is of the electrolyte insertion type and is designed to produce 20 volts and to have a capacity of 1.8 ampere hours. The plate or positive electrode consists of lead oxide ($PbO_2$) and the negative electrode is zinc (Zn). The electrolyte is sulphuric acid ($H_2SO_4$).

In FIG. 4 there is illustrated a series of curves which are characteristic of the auxiliary battery 13 of the present invention. These curves plot time versus charging current and charged voltage. Region I represents the characteristics after 6 minutes of charging. In such a condition the starter motor 10 was operated until it stopped and this produced 1600 ampere seconds. In region II there is illustrated the condition after 12 minutes of charging, and for this condition the motor 10 was operated until it stopped and produced 1300 ampere seconds. In region III there is illustrated the characteristics after 19 minutes of charging, and for this condition the starter motor 10 was operated until it stopped and produced 840 ampere seconds.

The characteristics for the auxiliary battery 13 are plotted in Table II. The same headings are used as for Table I. In Table II the factors $a$, $b$ and $c$ are plotted for the regions I, II and III.

TABLE II

| | $a$ (A. sec.) | $b$ (A. sec.) | $c$ (Percent) |
|---|---|---|---|
| I | 2,540 | 1,600 | 63 |
| II | 3,080 | 1,300 | 42 |
| III | 1,750 | 840 | 48 |

$a$—Charging amount.
$b$—Discharging amount.
$c$—$b/a$ x 100.

As was mentioned heretofore 750 ampere seconds is sufficient to start the normal automobile engine. As can therefore be seen, the auxiliary battery 13 will produce sufficient energy to start the motor 10 whether operated in region I, II or III.

In FIG. 1 the auxiliary battery 13 is shown schematically as it would be interconnected across a normal automobile battery 11. The auxiliary battery 13 is connected in parallel across the battery 11 with the terminals 14 and 15 and the corresponding terminals 14' and 15' being provided at any desired point. One circuit diagram for such a connection is shown in FIG. 5. The numeral 14 illustrates the conventional ammeter to register charging or discharging of the normal automobile battery 11. The terminals of the battery 11 in one embodiment of the invention are connected with the cigarette lighter 15 provided in the interior of the normal automobile. The auxiliary battery 13 of the present invention is thereafter connected to the cigarette lighter 15 in any conventional manner.

In one embodiment of the invention the auxiliary battery 13 weighed approximately 750 grams and had a volume of approximately 6.5 x 10 x 14 centimeters. The positive electrode occupied 50 square centimeters per unit and was made of lead oxide ($PbO_2$) and the negative electrode occupied 100 square centimeters per unit and was made from zinc (Zn). The electrolyte 16 is sulfuric acid ($H_2SO_4$) and is stored in a compartment 17 above the compartment 18 containing the electrodes.

The auxiliary battery 13 may be stored in any convenient place such as underneath the floor boards. When the automobile battery 11 runs down and will not start the automobile engine, the auxiliary battery 13 is in some manner interconnected in parallel with the automobile battery 11 as illustrated in FIG. 1. This can be done as illustrated in FIG. 5 by means of the cigarette lighter receptacle 15. When this connection has been completed, some means is provided for breaking the seal between the compartments 17 and 18 to allow the electrolyte to flow about the electrodes in the compartment 18. In one form of the invention this is accomplished by providing a plunger 19 to break the seal between the compartments 17 and 18 to allow the electrolyte in the compartment 17 to flow into the compartment 18 to activate the auxiliary battery. In order to permit the escape of fumes, a gas leak pipe 20 is provided.

As illustrated in FIG. 4 after a passage of 6 minutes or more the battery 11 is recharged sufficiently to permit the automobile motor 10 to turn over and start the engine. The battery 13 is then replaced by another battery 13 which remains inactive until desired.

In the embodiment illustrated in FIG. 5 a male plug is provided for insertion in the receptacle of the cigarette lighter 15. This male plug 21 is provided with leads to interconnect with the female plug 22 which is interconnected with the electrodes of the auxiliary battery 13.

What has been described in an auxiliary battery which is small in size, compact, lightweight and inexpensive to manufacture and which may be stored in an automobile for indefinite periods of time without in any way discharging. Whenever the normal automobile battery runs down and will not start the automobile, the auxiliary battery of the present invention may be quickly connected in parallel across the automobile battery, instantaneously activated and provides sufficient energy to recharge the normal automobile battery in a short period of time. The auxiliary battery of the present invention must have a larger voltage than a conventional automobile battery; it must have a sufficient capacity to produce 750 amperes per second or more. This latter figure represents the minimum now required to start the normal automobile engine. It has been determined for practical purposes that the auxiliary battery may have a rating of 1.8 ampere hours and have a voltage of 20 volts for a normal automobile battery having a voltage of 12 volts.

It is to be understood that although a preferred form of the invention has been described that changes and modifications may be made thereto without departing from the scope of the present invention, except as limited by the appended claims.

What is claimed is:

1. In combination with a secondary battery for operating the starter motor of an internal combustion engine; a system for quickly recharging said secondary battery upon the discharge of the latter, comprising an auxiliary battery which is normally inoperative, having no electrical charge, and which may be made operative quickly, said auxiliary battery when operative having a voltage substantially greater than the voltage of said secondary battery and further having a capacity of 1 to 5 ampere-hours and being capable of discharging at a rate of at least 750 amperes/second, means to render operative said auxiliary battery, and means to connect said auxiliary battery, when operative, with the discharged secondary battery, whereby to rapidly recharge the latter sufficiently for operation of the starter motor.

2. The combination according to claim 1, in which said auxiliary battery has at least two compartments, one of said compartments having mounted therein negative and positive electrodes and the other of said compartments having stored therein an electrolyte which is normally isolated from said electrodes, and said means to render operative said auxiliary battery includes means to selectively permit said electrolyte to enter said one compartment from said other compartment.

3. The combination according to claim 2, in which said positive electrodes are of $PbO_2$, said negative electrodes are of $Zn$ and said electrolyte is $H_2SO_4$.

4. The combination according to claim 1, in which said secondary battery is a 12 volt battery and said auxiliary battery has a voltage of 20 volts.

References Cited

UNITED STATES PATENTS

| | | | |
|---|---|---|---|
| 2,640,863 | 6/1953 | Ellis | 136—90 |
| 3,105,910 | 10/1963 | Chambers | 320—2 X |
| 3,309,598 | 3/1967 | Montgomery et al. | 320—2 |

OTHER REFERENCES

Popular Mechanics, January 1963, p. 151, Hearing-Aid Battery Charger Extends Cell Life.

J. D. TRAMMELL, Primary Examiner

STANLEY WEINBERG, Assistant Examiner

U.S. Cl. X.R.

136—90